Patented July 13, 1943

2,324,056

UNITED STATES PATENT OFFICE 2,324,056

CRACKING INHIBITOR

Bernard C. Barton, Passaic, N. J., assignor to United States Rubber Company, New York, N. Y., a corporation of New Jersey No Drawing. Application May 31, 1941,
Serial No. 396,191

11 Claims. (Cl. 260—800)

This invention relates to improvements in atmospheric cracking inhibitors for rubber and rubber-like substances, natural or artificially prepared. By atmospheric cracking, often popularly called sun-cracking, is meant the cracking which occurs when rubber under tension is subjected to various atmospheric agencies, the most important of which is believed to be ozone.

An object of the invention is to provide chemicals which will protect the surface of rubber, unvulcanized or vulcanized, from cracking when exposed to the atmosphere under static conditions of strain, without producing visible bloom. An objection to the heretofore use of waxes for the purpose is that when used in amounts sufficient to give protection they produce an objectionable bloom, and they also fail to give protection when the rubber is exposed to the atmosphere under dynamic conditions. A further object of the invention is to provide chemicals which will protect the surface of rubber from cracking when exposed to the atmosphere under dynamic conditions such as repeated bending or flexing, etc. Other objects will be apparent from the following description.

The invention comprises broadly the incorporation in rubber of a chemical having the general formula

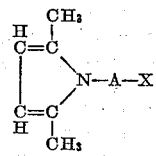

where A is a bivalent aromatic group such as phenylene, biphenylene, naphthylene, etc.; and X is an amino radical selected from the group consisting of primary amino, alkylamino, dialkylamino, and aralkylamino. The radical A may or may not be further substituted by alkyl groups. Exemplary of such atmospheric cracking inhibitors are the following compounds:—

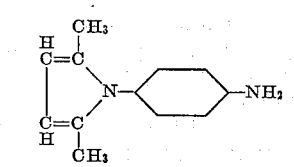

1-(p-aminophenyl)-2,5-dimethyl pyrrole

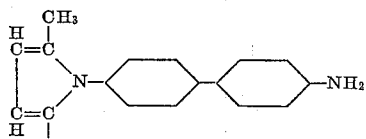

1-(p-aminoxenyl)-2,5-dimethyl pyrrole

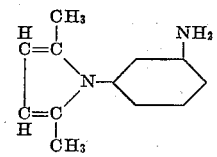

1-(m-aminophenyl)-2,5-dimethyl pyrrole

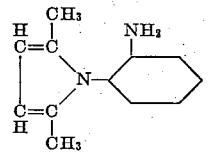

1-(o-aminophenyl)-2,5-dimethyl pyrrole

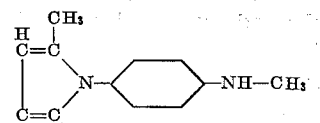

1-(p-dimethylaminophenyl)-2,5-dimethyl pyrrole

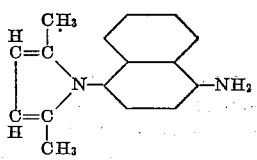

1-(p-methylaminophenyl)-2,5-dimethyl pyrrole

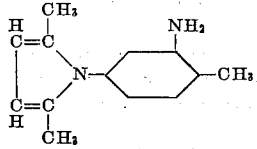

1-(2,5-dimethyl-pyrryl)-4-amino naphthalene

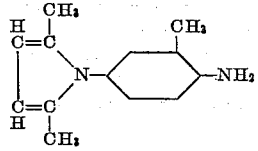

1-(3-amino-4-methylphenyl) 2,5-dimethyl pyrrole 1-(3-methyl-4-aminophenyl) 2,5-dimethyl pyrrole These chemicals may be prepared by well-known methods.

The following preparation of N-(m-aminophenyl)-2,5-dimethyl pyrrole is illustrative of the general method employed.

Two mols (216 gms.) of m-phenylene diamine, two mols (228 gms.) of acetonylacetone and 100 cc. of 95% ethyl alcohol are refluxed gently in an oil bath kept at 130–140° C. for five hours. The mixture is then poured into 500 cc. of cold water with stirring and the crystalline product is separated by filtration. The product, crude 1-(m-aminophenyl)-2,5-dimethyl pyrrole melts at approximately 86°–90° C. Recrystallization from water yields a pure material of melting point 97°–98° C. Analysis: 15.1% nitrogen; theory, 15.0%.

The compounds may be used in amounts varying from 0.5% to 10% based on the rubber. In general, at least 1% based on the rubber is required in order to produce a noticeable effect and substantially complete protection is reached when about 3% based on the rubber is used.

These compounds may be used in conjunction with waxes and this is especially valuable when low amounts are employed since the protective effect of each of the two types of agents has been found to reinforce the other. In general, they are used in conjunction with and in addition to the usual anti-oxidants.

Any rubber or rubber-like compound may be used in the practice of this invention. The invention may be applied to the treatment of natural rubbers as well as artificially-prepared rubbers such as the synthetic elastomers known as Neoprene, Perbunan, Buna, and including reclaims and latices of such rubbers. In general, larger concentrations of these chemicals are required to effect the same degree of protection in "tread compounds" (i. e. rubber compounds containing relatively large proportions of carbon black) than in compounds containing none or only small amounts of carbon black.

A typical tread compound containing in parts by weight:

| | |
|---|---|
| Smoked sheet | 100 |
| Carbon black | 50 |
| Softener | 7 |
| Zinc oxide | 5 |
| Anti-oxidant | 1 |
| Accelerator | 1 | was vulcanized in a press for 35 min. at 50 lbs. per square inch steam pressure to form a sheet approximately one-tenth inch in thickness. A 1-inch by 4-inch strip of this was stretched 30% and exposed to the atmosphere, while stretched, for two weeks. After this treatment this sample of rubber contained many large deep cracks. To separate portions of the above compound were added the following chemicals in the proportions indicated, by milling at 150° C.

| | |
|---|---|
| 1-(p-amino-phenyl)-2,5-dimethyl pyrrole | 4.0 |
| 1-(p-amino-xenyl)-2,5-dimethyl pyrrole | 4.0 |
| 1-(m-amino-phenyl)-2,5-dimethyl pyrrole | 4.0 |
| 1-(o-amino-phenyl)-2,5-dimethyl pyrrole | 3.0 |
| 1-(p-dimethylamino phenyl)-2,5-dimethyl pyrrole | 3.0 |
| 1-(p-methylamino phenyl)-2,5-dimethyl pyrrole | 3.0 |

The resulting compounds were vulcanized as before and exposed to the atmosphere simultaneously with and under the same conditions as the control stock. None of the samples containing pyrrole compounds showed any sign of cracks at the end of the two-weeks' exposure.

A typical synthetic rubber compound containing in parts by weight:

| | |
|---|---|
| Butadiene-acrylic nitrite co-polymer (Perbunan) | 100 |
| Softener | 16.5 |
| Carbon black | 10 |
| Soft carbon black | 60 |
| Zinc oxide | 5 |
| Sulfur | 1.3 |
| Accelerator | 0.75 |
| 1-(p-amino phenyl)-2,5-dimethyl pyrrole | 3.0 | was vulcanized in a press for 40 minutes at 40 lbs. per square inch steam pressure to form a sheet approximately one-tenth inch in thickness. A 1-inch by 4-inch strip was bent in the form of a loop and exposed to the atmosphere while bent for two weeks. The surface contained no sign of cracks at the end of this period, whereas a strip of a similar compound not containing any cracking inhibitor and exposed at the same time contained many large deep cracks at the end of the two-weeks' period.

The amino-aryl-dimethyl pyrrole compounds are valuable in any rubber compound subjected to the atmosphere, particularly where the rubber is under tension, and more particularly where the rubber is subject to bending or flexing during exposure. The inhibitors may be incorporated into rubber during milling, or they may be mixed into rubber solutions and aqueous dispersions of rubber, or they may be applied to the surface of rubber articles as by painting or dipping.

Having thus described my invention, what I claim and desire to protect by Letters Patent is:

1. A rubber composition containing an N-(amino-aryl) 2,5-dimethyl pyrrole as an atmospheric cracking inhibitor.

2. A rubber composition containing a 1-(p-aminophenyl)-2,5-dimethyl pyrrole as an atmospheric cracking inhibitor.

3. A rubber composition containing a 1-(m-aminophenyl)-2,5-dimethyl pyrrole as an anti-atmospheric cracking agent.

4. A rubber composition containing a 1-(p-dimethylamino phenyl)-2,5-dimethyl pyrrole as an anti-atmospheric cracking agent.

5. A method which comprises incorporating in a rubber composition an N-(amino-aryl) 2,5-dimethyl pyrrole as an anti-atmospheric cracking agent.

6. A method which comprises incorporating in a rubber composition a 1-(p-aminophenyl)-2,5-dimethyl pyrrole as an anti-atmospheric cracking agent.

7. A method which comprises incorporating in a rubber composition a 1-(m-aminophenyl)-2,5-dimethyl pyrrole as an anti-atmospheric cracking agent.

8. A method which comprises incorporating in a rubber composition a 1-(p-dimethyl aminophenyl)-2,5-dimethyl pyrrole as an anti-atmospheric cracking agent.

9. A rubber composition containing as an anti-atmospheric cracking agent a compound having the general formula

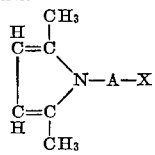

where A is a bivalent aromatic hydrocarbon group; and X is an amino radical selected from the group consisting of primary amino, alkylamino, dialkylamino, and aralkylamino.

10. A method which comprises incorporating in a rubber composition as an anti-atmospheric cracking agent a compound having the general formula

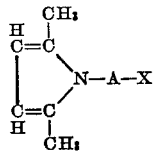

where A is a bivalent aromatic hydrocarbon group; and X is an amino radical selected from the group consisting of primary amino, alkylamino, dialkylamino, and aralkylamino.

11. A rubber composition having incorporated therein an N-(amino-phenyl) 2,5-dimethyl pyrrole as an inhibitor of atmospheric cracking.

BERNARD C. BARTON.